(12) United States Patent
Eloy et al.

(10) Patent No.: US 11,032,358 B2
(45) Date of Patent: Jun. 8, 2021

(54) MONITORING WEB APPLICATIONS INCLUDING MICROSERVICES

(71) Applicant: Hewlett-Packard Development Company, L.P., Spring, TX (US)

(72) Inventors: Leonardo Eloy, Fort Collins, CO (US); Carlos Alexandre Lima, Porto Alegre (BR); Paul Michael Anderson, Fort Collins, CO (US); Chris Myers, Vancouver, WA (US); Shane I Saunders, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/770,093

(22) PCT Filed: Jan. 31, 2018

(86) PCT No.: PCT/US2018/016239
§ 371 (c)(1),
(2) Date: Jun. 5, 2020

(87) PCT Pub. No.: WO2019/152021
PCT Pub. Date: Aug. 8, 2019

(65) Prior Publication Data
US 2020/0389517 A1 Dec. 10, 2020

(51) Int. Cl.
*G06F 15/16* (2006.01)
*H04L 29/08* (2006.01)

(52) U.S. Cl.
CPC .......... *H04L 67/1002* (2013.01); *H04L 67/02* (2013.01)

(58) Field of Classification Search
CPC ..................... H04L 67/1002; H04L 67/02
USPC ........................................................ 709/223
See application file for complete search history.

(56) References Cited

U.S. PATENT DOCUMENTS

| | | |
|---|---|---|
| 7,275,104 B1 | 9/2007 | Martinez et al. |
| 8,578,017 B2 | 11/2013 | Cobb et al. |
| 8,645,529 B2 | 2/2014 | Doddavula |
| 9,191,285 B1 | 11/2015 | Isaacson |
| 9,438,491 B1 | 9/2016 | Kwok et al. |

(Continued)

OTHER PUBLICATIONS

Jayathilaka, H. et al., Service-level Agreement Durability for Web Service Response Time, 2015, https://www.cs.ucsb.edu~ckrintz/papers/cloudcom15.pdf.

*Primary Examiner* — Moustafa M Meky
(74) *Attorney, Agent, or Firm* — Dicke Billig & Czaja PLLC (57) ABSTRACT

Monitoring an availability of a dynamically scalable web application having a plurality of microservices deployed on groups of servers each fronted by a load balancer. Examples include retrieving access log data entries from each load balancer, with the access log of each load balancer including a data entry for each HTTP Request received by the load balancer for the web application, each data entry including a Timestamp, an HTTP URL, and an HTTP Method of the HTTP Request, and a status code of a corresponding HTTP response, and with each microservice having a corresponding HTTP URL/HTTP Method pair. An availability of each microservice is determined based on the status codes of HTTP responses corresponding to data entries having HTTP URL/HTTP Method pairs corresponding to the microservice.

15 Claims, 5 Drawing Sheets

(56) References Cited

U.S. PATENT DOCUMENTS

| | | |
|---|---|---|
| 9,553,781 B2 | 1/2017 | Finkelstein et al. |
| 10,686,862 B2* | 6/2020 | Koszek .................... G06F 9/46 |
| 2016/0149769 A1 | 5/2016 | Joshi et al. |
| 2017/0187583 A1 | 6/2017 | Beltt et al. |
| 2017/0208122 A1* | 7/2017 | Yabe ....................... H04L 67/42 |
| 2018/0027080 A1* | 1/2018 | Yang ........................ G06F 8/60 |
| | | 709/224 |
| 2019/0335004 A1* | 10/2019 | Yang ...................... G06F 8/316 |

* cited by examiner

MONITORING WEB APPLICATIONS INCLUDING MICROSERVICES

BACKGROUND

Users typically enter into service level agreements (SLAs) with web service providers which guarantee that the web services will be available for an agreed upon percentage of time.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Service level agreements (SLAs) guarantee that web services will be available to users for a guaranteed percentage of time (e.g.; greater than 99.9%). To enhance reliability and performance, web service providers have evolved to deploying web applications across distributed networks and to providing scalability of web services via on-demand web service node deployment, with load balancers being disposed in front of a collection of web service nodes to efficiently route user requests to the dynamically created (and removed) web service nodes.

Conventional web service monitoring techniques, such as Internet Control Message Protocol (ICMP) Ping Queries, HyperText Transfer Protocol (HTTP) Requests to a specific RESTfuf endpoint, and Probing Agents, for example, may not be reliable when applied to distributed networks. In a distributed network, a ping query is sent to a load balancer, not to a web service node, and HTTP Requests, while routed to a single node, do not necessarily assess whether the node is available. A probing agent requires installation of a software client within a web service node in order to talk back to a probing server to determine availability. However, the inability of a probing agent to communicate with a corresponding probing server does not necessarily indicate that a web service is unavailable. Instead, such inability to communicate might be caused by a network outage with the probing server or some specific error in connection between the probing agent and server, which may be different from actual behavior between the web service and a user.

Current web application implementation techniques partition web applications into smaller, more manageable components, referred to as "microservices", where such microservices are deployed across a distributed network (e.g.; different servers, different data centers, etc.), and where each of any number of functions of the web application are provided by one or more microservices. In collection, the microservices deliver the same functionality as a monolithically deployed web application (e.g.; deployed on a single server).

Requests for web application services are typically made using HTTP Requests. One web service monitoring technique attempts to take into account the dynamic nature of web service scalability by tracking HTTP Requests and corresponding HTTP responses, but considers web applications to be monolithically scaled at given node. While such technique calculates an overall or global SLA value for a web application, it provides no information with regard to the performance of the individual microservices forming the web application. According to such technique, even though an overall SLA value may indicate that availability requirements for the web application as a whole are being met, the potential exists that individual microservices of the web application may not be available such that a user may still be experiencing unsatisfactory service.

Figure 1:
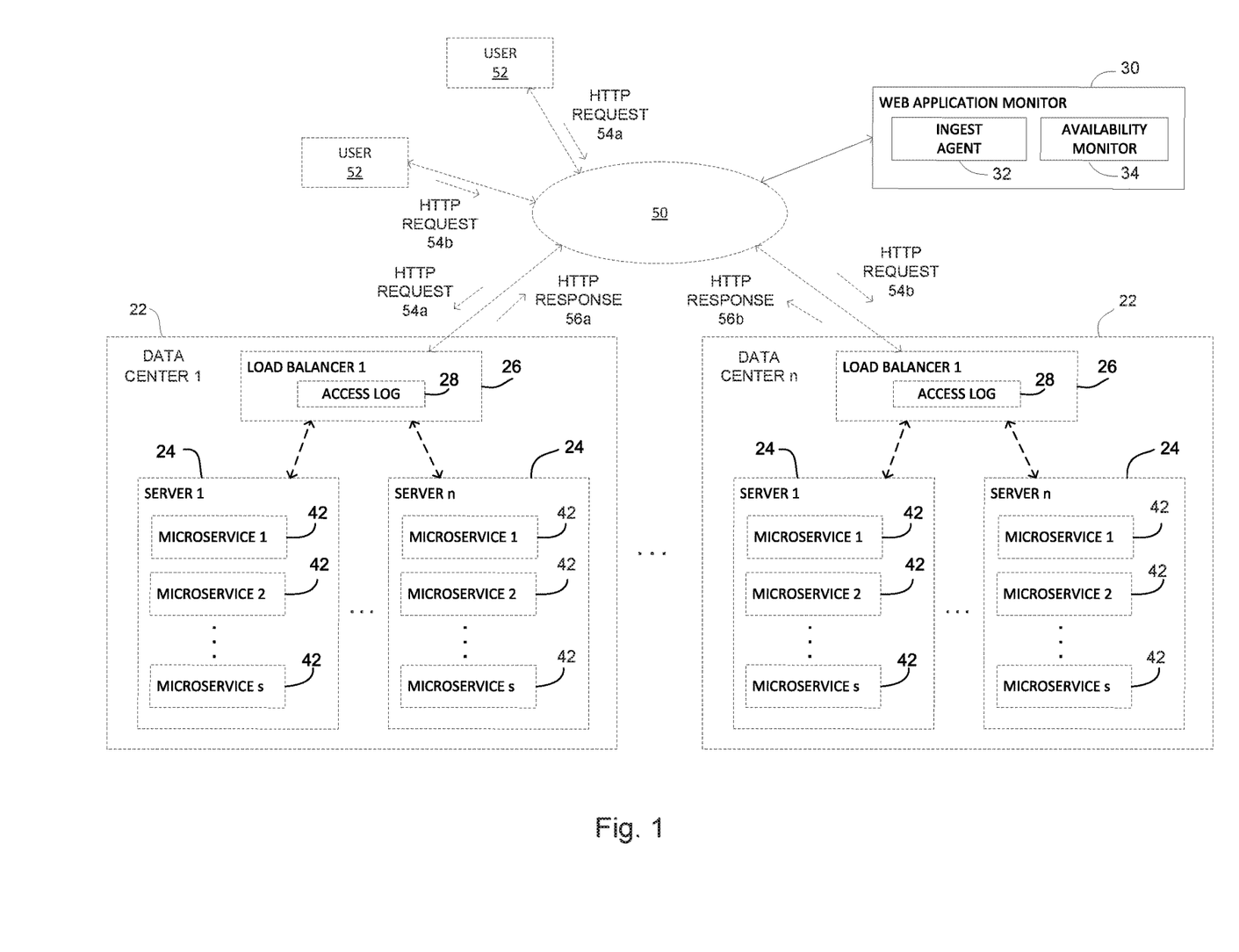
FIG. 1 is a block and schematic diagram generally illustrating a network including a web application monitor, according to one example

FIG. 1 is a block and schematic diagram illustrating generally an example of a network system 20 including a web application monitoring system 30 having an ingest agent 32 and an availability monitor 34 to monitor a service level availability of a dynamically scalable web application 40 residing on network 20, including monitoring availabilities of individual microservices and functions of web application 40, according to one example of the present disclosure.

According to the example of FIG. 1, network system 20 is a distributed network including a number of groups 22 of servers 24, illustrated as servers 1 through "m", each group 22 of servers 24 fronted by a load balancer 26. In one case, each group 22 of servers 24 is a data center, or a portion of a data center, such as illustrated by data centers 1 through "n". Although illustrated as including one load balancer 26, each data center 22 may include multiple load balancers, with each load balancer 26 corresponding to a different web application, for example.

Web application 40, according to one example, as described above, is dynamically scalable and is deployed as a plurality microservices 42, illustrated as microservices 1 through "s", across multiple servers 24 and data centers 22 of network 20. In one example, multiple instances of web application 30 and microservices 32 may be dynamically created (and destroyed) on demand on different nodes (servers) of network system 20 based on user demand. In one example, web application 30 includes a plurality of different functions, such as function 44, where each function 44 comprises one or more microservices 42.

Data centers 22 are in communication with one another and with web application monitoring system 30 via a network 50, such as the Internet, so that data centers 22 and web application monitoring system 30 may be geographically local to one another or geographically separated from one another. In one example, web application monitoring system 30 resides on one or more servers 24 in one or more data centers 22. As will be described in greater detail below, web application monitoring system 30, in accordance with one example of the present disclosure, monitors an overall performance of web application 40 as well as performances of individual microservices 42 and functions 44 deployed across network 20.

According to one example, users 52 submit service requests (e.g., via a web browser) for web application 40 in the form of HTTP Requests 54 which are routed via Internet 50 (e.g., via a domain name server (DNS)) to one of the plurality of load balancers 26 associated with web application 40. Each HTTP Request 50 includes a number of elements including, among others, an HTTP URL (a request target), and HTTP Method (an action to be performed such as a GET or POST action, for example), and a Timestamp, where each microservice 42 of web application 40 corresponds to a different HTTP URL/HTTP Method pair. For instance, in one illustrative example, "Microservice 1" corresponds to the pair HTTP $URL_A$/HTTP Method "X" (e.g., GET), and "Microservice 2" corresponds to HTTP $URL_A$/Method "Y" (e.g., POST), where Microservice "1" and "Microservice 2" are each part of a same function 44 (e.g., "Function 1").

Each load balancers 26 distributes incoming HTTP Requests 54 to the an microservice 32 on an appropriate server 24 based at least on the HTTP URL/HTTP Method pair and on a load balancing method (e.g.; Least Response Time method) to optimize web application resources and response times to HTTP Requests 54 from users 52. After receiving and interpreting an HTTP Request 50, a server, such as server 24, provides a corresponding HTTP Response 56 which, among other elements, includes a Status Code indicative of one of a numbers of classes of responses, such as whether the request was successful (e.g.; a Status Code having a value between 200-299), or whether there was a server error of some type (e.g.; a Status Code having a value between 500-599), for example.

In one example, for each HTTP Request 54 received by a load balancer 26 for web application 40, load balancer 26 provides a data entry in an access log 28, where, in one case, each data entry includes the HTTP URL, HTTP Method, and Timestamp of the HTTP Request, and the Status Code of the corresponding HTTP Response. In one example, although not illustrated, each load balancer 36 may be associated with more than one web application where, in such case, load balancer 36 maintains a separate access log 28 for each web application.

In operation, according to one example, to determine a service level availability of web application 40 and the individual microservices 42 thereof, ingest agent 32 of web application monitor 30 parses data entries from the access log 28 of each load balancer 26, such as for a selected period of time (e.g. 30 second intervals), for instance. In one example, ingest agent 32 determines a total number of times each HTTP URL/HTTP Method pair was requested and a total number of times the Status Code for each HTTP URL/HTTP Method pair is indicative of a server error (a Status Code having a value between 500-599).

In one example, based on the data for each HTTP URL/HTTP Method pair collected by ingest agent 32, availability monitor 34 determines a service availability for each microservice 42, sometimes referred to as a function level availability (e.g., a percentage of successful HTTP response (e.g., those not having an Status Code value between 500-599) relative to a total number of HTTP Requests). In one example, availability monitor 34 determines a service level availability of web application 40 by aggregating the function level availabilities of each microservice 42 of web application 40 (e.g., by determining a weighted-average).

By monitoring a function level availability of each function or microservice of a web application with web application monitor 30, in accordance with the present disclosure, a web service provider is able to identify microservices 42 of web application 40 which are not operating properly, even though a service level availability of web application 40 as whole may be meeting contractual availability requirements. Such monitoring enables web service providers to address shortcomings of individual web application microservices/functions that might otherwise go undetected, thereby improving both web application reliability and user satisfaction. Additionally, by using actual user HTTP Request/HTTP Response data, web application monitor 30 enables identification of malfunctioning microservices in real-time and based on actual user experience rather than on data based on simulated service requests (e.g. Ping queries, Probing Agents).

Figure 2:
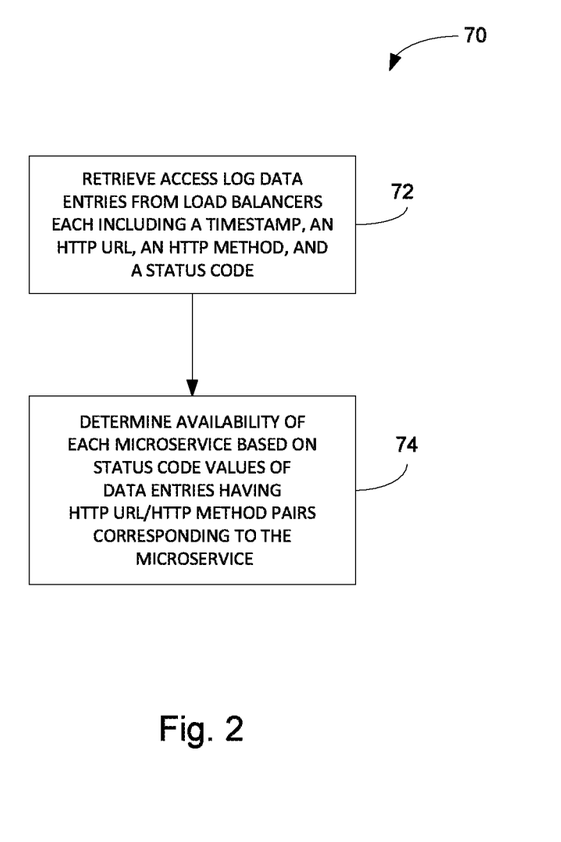
FIG. 2 is a flow diagram illustrating a method of monitoring a web application, according to one example.

FIG. 2 is a flow diagram illustrating a method 70, according to one example, of monitoring a dynamically scalable web application, such as web application 40, having a plurality of microservices, such as microservices 42, deployed on groups of servers, such as servers 24 of data centers 22, each fronted by a load balancer, such as load balancers 26. At 72, method 70 includes retrieving access log data entries from each load balancer, such as data entries from access logs 28 of load balancers 26, where the access log of each load balancer includes a data entry for each HTTP Request received by the load balancer for the web application, and where each data entry including a Timestamp, an HTTP URL, and an HTTP Method of the HTTP Request, and a status code of a corresponding HTTP response, and with each microservice having a corresponding HTTP URL/HTTP Method pair.

At 74, method 70 includes determining an availability of each microservice based on the status codes of entries having HTTP URL/HTTP Method pairs corresponding to the microservice. In one instance, an availability of each microservice is determined as a percentage based on a total of times the corresponding HTTP URL/HTTP Method pair was requested and on a value of the corresponding Status Codes (e.g., a percentage of times the Status Code had a value outside of the range 500-599).

Figure 3:
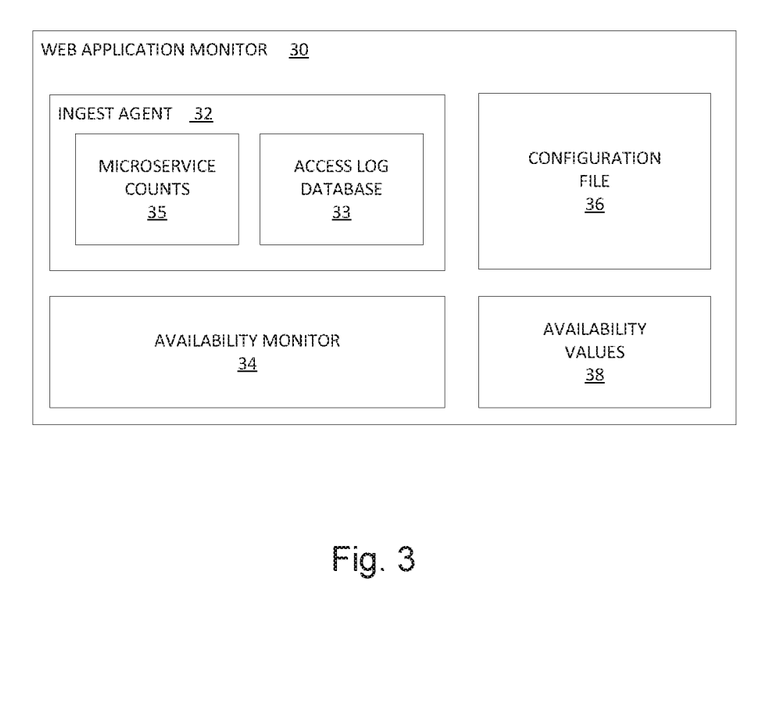
FIG. 3 is a block diagram generally illustrating a web application monitor, according to one example.

FIG. 3 is a block diagram generally one example of web application monitor 30, according to the present disclosure. According to the illustrated example, in addition to ingest agent 32 and availability monitor 34, web application monitor 30 includes a configuration file 36 and availability values 38, with ingest agent 32 further including access log data base 33 and microservice counts 35. According to one example, ingest agent 32 retrieves data entries from access logs 28 of each load balancer 26 in an on-going basis and stores each access log data entry as a data base entry in access log data base 33. In one example, each data base entry at least includes the Timestamp, the HTTP URL, and the HTTP Method and the Status Code of each retrieved access log entry.

In one example, upon the expiration of a given time period (such as every 30 seconds, for example), ingest agent 32 parses access log data base 33 for all HTTP requests 54 for web application 40 that occurred during the given time period based on the time stamp associated with each access log entry. In one example, configuration file 36 maintains a list of the HTTP URL/HTTP Method pairs corresponding to each microservice 42. In one instance, for the given time period, ingest agent 32 counts a total number of times each HTTP/HTTP Method pair was requested (i.e., how many times each microservice 42 was requested) and how many times the corresponding Status Code indicated a failed response (e.g., a Status Code having a value in a range of 500-599) and stores such counts for each microservice 42 as microservice counts 35.

According to one example, using the stored microservice counts 35, availability monitor 34 determines a percentage for the given time period (e.g., 30 seconds) that each microservice 42 was available (i.e., a successful response) based on the total number of HTTP requests and failed responses for the corresponding HTTP URL/HTTP Method pair. In one example, for the given time period, availability monitor 34 additionally aggregates the total number of requests and total number of failed responses of all microservices 42 of web application 40 and determines a service level availability (i.e., successful HTTP responses) for web application 40 as a whole.

In one example, for each time period (e.g., for each 30 second time period), availability monitor 34 stores, as availability values 38, the total number of HTTP Requests and the percentage of successful HTTP Responses (e.g., Status Code having a value not within the range 500-599) for each microservice 42, and stores the total number of HTTP Requests and the availability percentage of web application 40 as a whole. In one example, availability monitor 34, using availability values 38, determines for a selected time period (e.g., a day, a week, a month, etc.), an aggregated availability of each microservice 42 and for web application 40 as a whole.

In one example, configuration file 36 further includes a list of microservices 42 corresponding to each function 44. In one example, in a fashion similar to that described above with regard to microservices 42, availability monitor 34 determines an availability percentage of each web application function 44.

In one example, in addition to the Timestamp, HTTP URL, HTTP Method, and Status Code of each retrieved access log entry, each data base entry in access log data base 33 further includes an identifier of the load balancer 26 from which the access log entry was retrieved. In one example, in a fashion similar to that described above, based on such load balancer identifier, availability monitor 34 determines an availability of the microservices 42 and functions 44 of each load balancer 26 and an availability of the microservices 42 of the load balancer as a whole.

Figure 4:
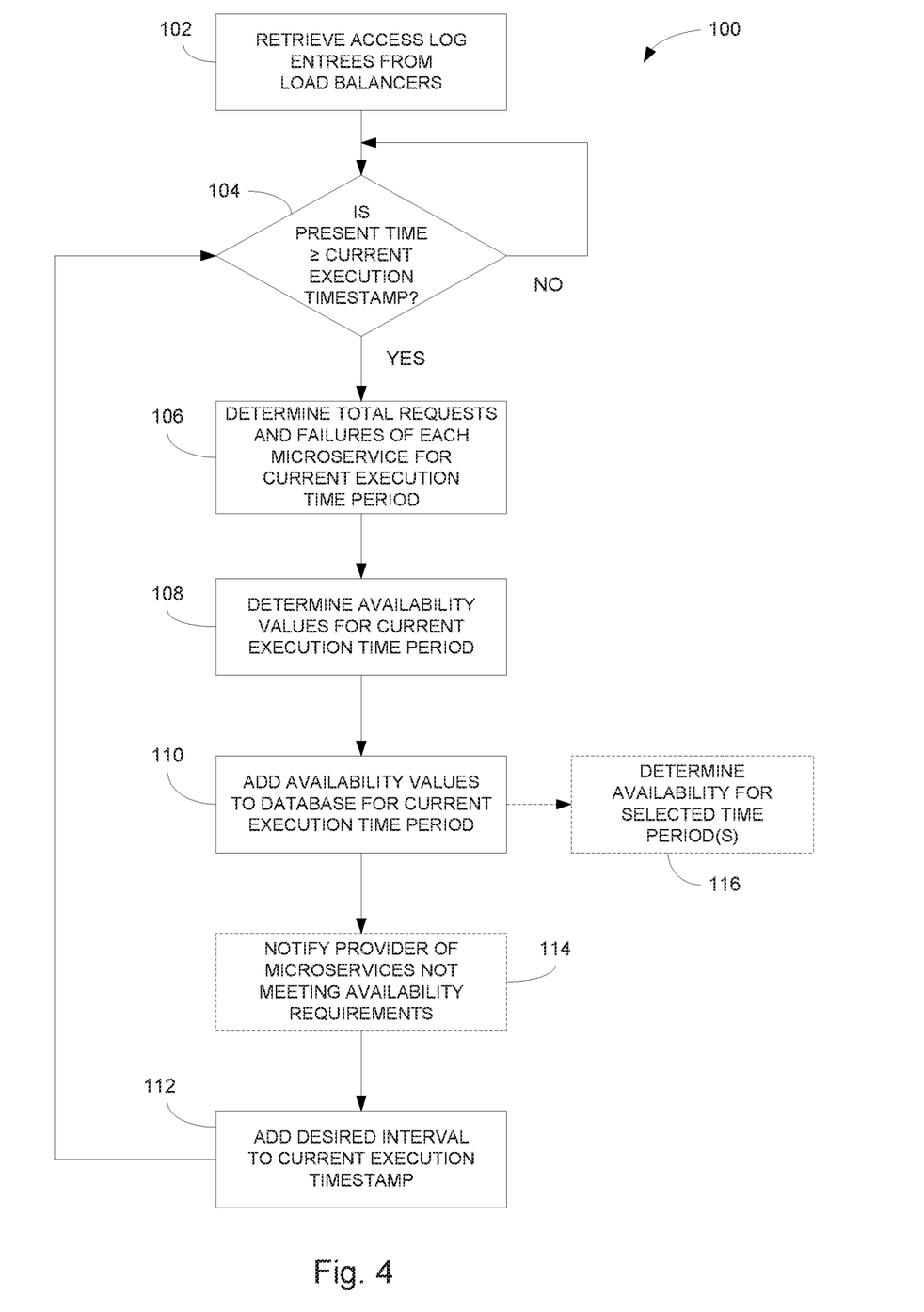
FIG. 4 is a flow diagram illustrating a method of monitoring a web application, according to one example.

FIG. 4 is a flow diagram illustrating a method 100, according to one example, of monitoring an availability of a dynamically scalable web application including a number of microservices deployed on a distributed network including a plurality of load balancers each fronting a group of servers, such as web application monitor 30 monitoring web application 40 including a number of microservices 42 deployed on network 20 including a plurality of load balancers 26 fronting a number of servers 24 in a number data centers 22, as illustrated by FIG. 1.

At 102, method 100 includes continually retrieving and storing access log data entries from each load balancer, where the access log of each load balancer includes a data entry for each HTTP request received by the load balancer for the web application, with each access log data entry including a Timestamp, an HTTP URL, and an HTTP Method of the HTTP request, and a Status Code of a corresponding HTTP Response, and with each microservice corresponding to an HTTP URL/HTTP Method pair, such as ingest agent 32 retrieving and storing access log data entries from access logs 28 of load balancers 26 in access log data base 33, as described by FIG. 3. In one example, in addition to the Timestamp, HTTP URL, HTTP Method, and Status Code, ingest agent 32 includes an identifier of the load balancer 26 from which each access log data entry was retrieved.

At 104, method 100 queries whether the present time is greater than or equal to a current execution timestamp. If the answer to the query is "no", method 100 continues checking the present time against the current execution timestamp. If the answer to the query is "yes", method 100 proceeds to 106.

At 106, based on the Timestamp of the access log data entries retrieved and stored at 102, a total number of HTTP Requests and a total number of failed responses for each microservice is determined for a selected time period (e.g., 30 seconds) preceding the current execution timestamp based respectively on the HTTP URL/HTTP Method pairs and the HTTP Response Status Code, such as by ingest agent 32 parsing access log data base 33 to count a total number of HTTP Requests and HTTP Response failures for each microservice 42, as described above with respect to FIG. 3. In one example, an HTTP Response is deemed to have failed when the Status Code has a value in a range from 500-599 (indicating a server error). In one example, the total number of HTTP Requests and HTTP Response failures for each microservice is stored in a database, such as ingest agent 32 storing the total number of HTTP Requests and HTTP Response failures for each microservice 42 at microservice counts 35, as illustrated by FIG. 3.

At 108, for a current execution time period (e.g., a 30 second time period preceding the current execution timestamp), a percentage that each microservice was available (i.e., a percentage of successful HTTP Responses) is determined based on the total number of HTTP Requests and HTTP Response failures as determined at 106, such as determined by availability monitor 34 as described above with respect to FIG. 3, for example. For instance, a total number of successful HTTP Responses is equal to the total number of HTTP Requests less a total number of HTTP response failures for each microservice. In one example, an availability of the web application as a whole (the so-called "service level availability") is also determined by aggregating the availability percentages and total HTTP Requests for all microservices of the web application.

At 110, for the current execution time period, the total number of HTTP Requests and the availability percentage (the so-called "function level availability") for each microservice, as determined at 108, are stored in a database, such as availability monitor 34 storing the availability percentage and total number of HTTP Requests for each microservice 42 as availability values 38 in FIG. 3, for example. In one example, the aggregated availability and total number of HTTP requests for the web application, as determined at 108, are further stored as availability values 38 by availability monitor 34.

In one example, in addition to determining the availability percentage and total number of HTTP Requests overall for each microservice for the current time period, an availability percentage and total number of HTTP Requests for each microservice for each load balancer is determined and stored at 108 and 110 based on the load balancer identifier included in each access log database entry, such as described above with respect to availability monitor 34 of FIG. 3.

At 112, after the availability percentage and total number of HTTP Requests for each microservice has been determined at 108 and 110, the desired or selected time interval is added to the current execution timestamp and method 100 returns to 104 to repeat the process for the "next" current time period. In one example, the selected time interval is 30 seconds, for example. In other examples, the selected time interval may be an interval other than 30 seconds, such as 60 seconds, or 120 seconds, for example.

In one example, as indicated at 114, method 100 further includes providing notification, such as to a web application provider, when an availability of any microservice or web application, as determined at 108, is below a desired functional level or service level for the current execution time period, such as below 99.9 percent availability, for instance.

In one example, as indicated at 116, method 100 includes determining functional availabilities of each microservice and of the web application as a whole for any selected time period (e.g., an hour, a day, a week, a month, etc.) using the availability percentages and total number of HTTP requests for each microservice and for the web application as a whole for each execution time period (e.g., for each 30 second execution time period) as stored at 110, thereby enabling a provider of the web application to monitor both the performance of the web application and microservices for and changes in performance over time.

Figure 5:
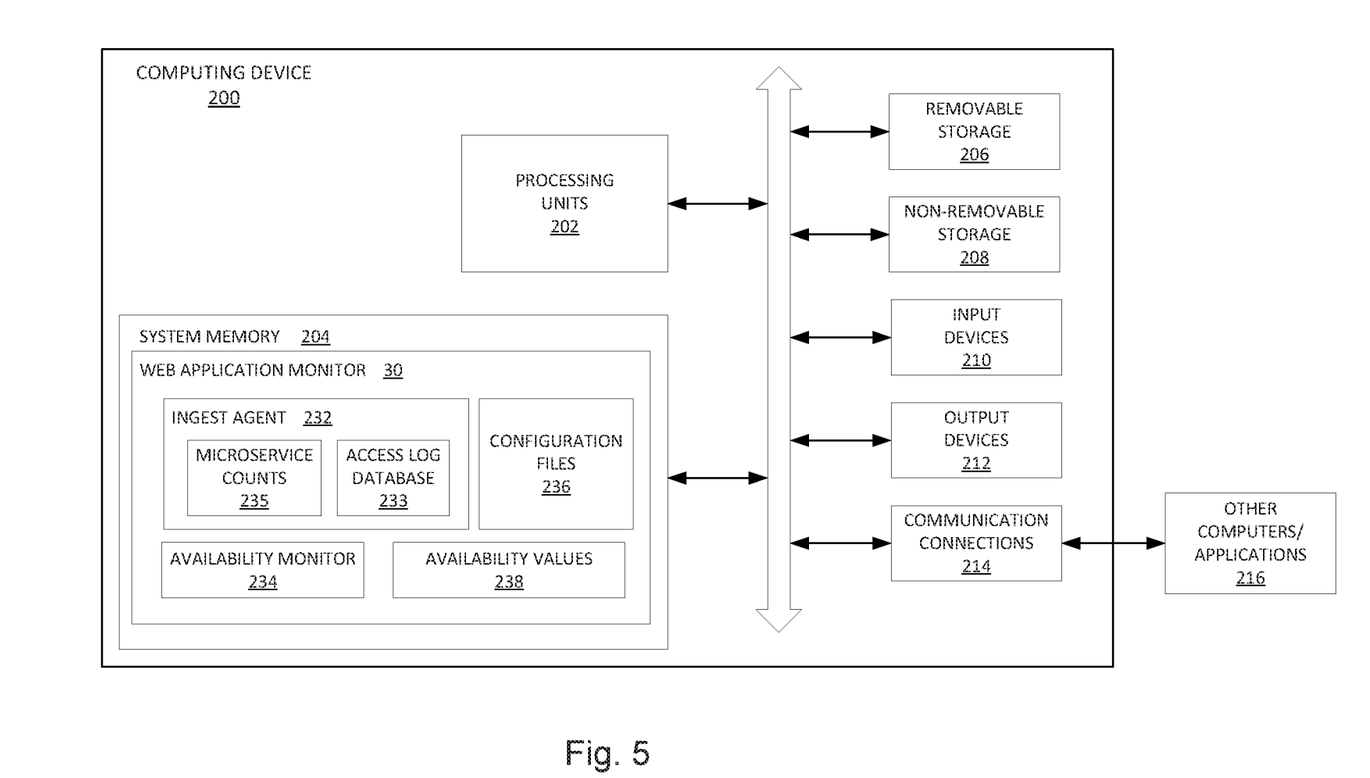
FIG. 5 is a block and schematic diagram generally illustrating a computing system for implementing a web application monitor, according to one example.

FIG. 5 is a block and schematic diagram generally illustrating a computing system 200 for implementing web application monitor 30 according to one example. In the illustrated example, computing system or computing device 200 includes processing units 202 and system memory 204, where system memory 204 may be volatile (e.g. RAM), non-volatile (e.g. ROM, flash memory, etc.), or some combination thereof. Computing device 200 may also have additional features/functionality and additional or different hardware. For example, computing device 200 may include input devices 210 (e.g. keyboard, mouse, etc.), output devices 212 (e.g. display), and communication connections 214 that allow computing device 10 to communicate with other computers/applications 216, wherein the various elements of computing device 200 are communicatively coupled together via communication links 218.

In one example, computing device 200 may include additional storage (removable and/or non-removable) including, but not limited to, magnetic or optical disks or tape. Such additional storage is illustrated in FIG. 4 as removable storage 206 and non-removable storage 208. Computer storage media includes volatile and nonvolatile, removable and non-removable media implemented in any suitable method or technology for non-transitory storage of information such as computer readable instructions, data structures, program modules, or other data, and does not include transitory storage media. Computer storage media includes RAM, ROM, EEPROM, flash memory or other memory technology, CD-ROM, digital versatile disks (DVD) or other optical storage, magnetic cassettes, magnetic tape, and magnetic disc storage or other magnetic storage devices, for example.

System memory 204, removable storage 206, and non-removable storage 208 represent examples of computer storage media, including non-transitory computer readable storage media, storing computer executable instructions that when executed by one or more processors units of processing units 202 causes the one or more processors to perform the functionality of a system, such as workload management system 20. For example, as illustrated by FIG. 4, system memory 204 stores computer executable instructions for web application monitor 30, including ingest agent instructions 232 (including access log data base 233 and microservice counts 235), configuration file instructions 2, and availability values 238, that when executed by one or more processing units of processing units 202 implement the functionalities of web application monitor 30 as described herein, such as by FIGS. 1-4, for instance. In one example, one or more of the at least one machine-readable medium storing instructions for web application monitor 30 may be separate from but accessible to computing device 200. In other examples, hardware and programming may be divided among multiple computing devices.

In some examples, the computer executable instructions can be part of an installation package that, when installed, can be executed by the at least one processing unit to implement the functionality of web application monitor 30. In such examples, the machine-readable storage medium may be a portable medium, such as a CD, DVD, or flash drive, for example, or a memory maintained by a server from which the installation package can be downloaded and installed. In other examples, the computer executable instructions may be part of an application, applications, or component already installed on computing device 200, including the processing resource. In such examples, the machine readable storage medium may include memory such as a hard drive, solid state drive, or the like. In other examples, the functionalities of web application monitor 30 may be implemented in the form of electronic circuitry.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A web application monitor comprising:
    an ingest agent to receive access log data entries from each load balancer of a plurality of load balancers, the access log of each load balancer including a data entry for each HTTP Request received by the load balancer for a web application comprising microservices deployed on a corresponding group of servers, each data entry including a Timestamp, an HTTP URL, and an HTTP Method of the HTTP Request, and a Status Code of a corresponding HTTP Response, each microservice having a corresponding HTTP URL/HTTP Method pair; and
    an availability monitor to determine an availability of each microservice based on the status codes of data entries having corresponding HTTP URL/HTTP Method pairs.

2. The web application monitor of claim 1, for an execution time period, based on the Timestamp, the ingest agent, for each microservice, to determine a total number of HTTP Requests based on the number of data entries having corresponding HTTP URL/HTTP Method pairs and a total number of HTTP Response failures based on a value of the Status Code; and
    the availability monitor to determine an availability of each microservice as a percentage of a ratio of a total number of successful HTTP Responses to the total number of HTTP Requests.

3. The web application monitor of claim 2, a status code indicative of an HTTP Response failure having a value in a range from 500-599, and for each microserves, the total number of successful HTTP Response being the total number of HTTP Requests less a total number of HTTP Response failures.

4. The web application monitor of claim 2, the availability monitor providing notification if an availability of a microservice is less than a set point percentage.

5. The web application monitor of claim 2, the availability monitor to determine an availability of each microservice corresponding to each load balancer.

6. The web application monitor of claim 1, the availability monitor to determine an availability of the web application for the execution time period based on a weighted average of the availability of each of the microservices of the web application.

7. A method of monitoring a dynamically scalable web application having a plurality of microservices deployed on groups of servers each fronted by a load balancer, the method comprising:
   retrieving access log data entries from each load balancer, the access log of each load balancer including a data entry for each HTTP Request received by the load balancer for the web application, each data entry including a Timestamp, an HTTP URL, and an HTTP Method of the HTTP Request, and a status code of a corresponding HTTP response, each microservice having a corresponding HTTP URL/HTTP Method pair; and
   determining an availability of each microservice based on the status codes of entries having HTTP URL/HTTP Method pairs corresponding to the microservice.

8. The method of claim 7, including storing the retrieved data entries.

9. The method of claim 8, for each of a plurality of execution time periods, determining for each microservice from the stored entries, based on the Timestamp, a total number of HTTP Requests from the number of data entries having corresponding HTTP URL/HTTP Method pairs and a total number of HTTP Response failures based on a value of the Status Code.

10. The method of claim 9, including determining for each execution time period an availability of each microservice as a percentage of a ratio of a total number of successful HTTP Responses to the total number of HTTP Requests.

11. The method of claim 10, a status code having a value in a range from 500-599 being indicative of an HTTP Response failure, including determining the total number of successful HTTP Responses for each microservice includes subtracting a total number of HTTP Response failures form the total number of HTTP Requests.

12. The method of claim 10, including storing the availability and total number of HTTP Requests for each microservice for each execution time period; and
   determining an availability of each microservice for a selected time period including a plurality of execution time periods by aggregating the stored availability and total number of HTTP Requests of each execution time period included in the selected time period.

13. A non-transitory computer-readable storage medium comprising computer-executable instructions, executable by at least one processor to:
   retrieve access log data entries from each load balancer of a plurality of load balancers, the access log of each load balancer including a data entry for each HTTP Request received by the load balancer for a web application comprising microservices deployed on a corresponding group of servers, each data entry including a Timestamp, an HTTP URL, and an HTTP Method of the HTTP Request, and a status code of a corresponding HTTP response, each microservice having a corresponding HTTP URL/HTTP Method pair; and
   determine an availability of each microservice based on the status codes of entries having HTTP URL/HTTP Method pairs corresponding to the microservice.

14. The non-transitory computer-readable storage medium of claim 13, further including instructions executable by the at least one processor to:
   store the retrieved data entries;
   for each of a plurality of successive execution time periods, determine for each microservice from the stored data entries, based on the Timestamp, a total number of HTTP Requests from the number of data entries having corresponding HTTP URL/HTTP Method pairs and a total number of HTTP Response failures based on a value of the Status Code; and
   store, for each execution time period, the availability and total number of HTTP Requests for each microservice.

15. The non-transitory computer-readable storage medium of claim 13, further including instructions executable by the at least one processor to:
   determine an availability of each microservice for a selected time period including a plurality of execution time periods by aggregating the stored availability and total number of HTTP Requests of each execution time period included in the selected time period.

* * * * *